United States Patent
Sandstrom et al.

[11] Patent Number: 5,695,216
[45] Date of Patent: Dec. 9, 1997

[54] AIRBAG DEVICE AND PROPELLANT FOR AIRBAGS

[75] Inventors: Jorgen Sandstrom; Anders Hafstrand; Per Sjoberg, all of Karlskoga, Sweden

[73] Assignee: Bofors Explosives AB, Karlskoga, Sweden

[21] Appl. No.: 671,336

[22] Filed: Jun. 27, 1996

Related U.S. Application Data

[63] Continuation-in-part of Ser. No. 127,371, Sep. 28, 1993.
[51] Int. Cl.[6] .................................................. B60R 21/26
[52] U.S. Cl. ......................... 280/737; 280/741; 280/742; 149/19.4; 149/19.7; 149/19.8; 149/62; 149/92
[58] Field of Search .......................... 280/736, 737, 280/739, 740, 742; 149/19.2, 19.4, 19.7, 22, 88, 109.6, 19.8, 64, 94, 19.6

[56] References Cited

U.S. PATENT DOCUMENTS

| | | | |
|---|---|---|---|
| 3,354,010 | 11/1967 | Hopper et al. | 149/18 |
| 3,636,881 | 1/1972 | Godfrey . | |
| 3,655,217 | 4/1972 | Johnson . | |
| 3,690,695 | 9/1972 | Jones, Sr. . | |
| 3,698,427 | 10/1972 | Baranowski, Jr. | 137/542 |
| 3,721,456 | 3/1973 | McDonald . | |
| 3,755,311 | 8/1973 | Zimmer-Galler . | |

(List continued on next page.)

FOREIGN PATENT DOCUMENTS

| | | |
|---|---|---|
| 0 520 104 A1 | 6/1991 | European Pat. Off. . |
| 366 695 | 8/1971 | Sweden . |

*Primary Examiner*—Christine Skane
*Assistant Examiner*—John R. Hardee
*Attorney, Agent, or Firm*—Pollock, Vande Sande & Priddy

[57] ABSTRACT

An airbag device including a gas-emitting substance chamber having an opening. A gas-emitting substance is provided in the gas-emitting substance chamber including between about seventy-six to about eighty percent by weight of a high energy explosive and about twelve to about fifteen percent by weight of a combustible binder. An igniter provided within the gas-emitting substance chamber ignites the gas-emitting substance. A pressure reducing valve arranged in the opening of the gas-emitting substance chamber maintains a desired pressure in the gas-emitting substance chamber during burning of the gas-emitting substance. A gas container having an opening contains a gas for oxidizing gas produced by burning of the gas-emitting substance. A closure closes the opening in the gas container. A mixing chamber is joined to the gas-emitting substance chamber and the gas container in the vicinity of the opening of the gas-emitting substance chamber and in the vicinity of the opening of the gas container. The openings of the gas-emitting substance chamber and the gas container are directed toward an interior of the mixing chamber. The mixing chamber includes at least one outlet for directing gas resulting from the burning of the gas-emitting substance toward an airbag. An airbag is interconnected with the mixing chamber and is inflated by the gas resulting from the burning of the gas-emitting substance.

18 Claims, 1 Drawing Sheet

U.S. PATENT DOCUMENTS

| | | | |
|---|---|---|---|
| 3,756,621 | 9/1973 | Lewis et al. . | |
| 3,897,962 | 8/1975 | Sack | 280/150 |
| 3,901,530 | 8/1975 | Radke | 280/150 AB |
| 3,943,017 | 3/1976 | Wells | 149/19.8 |
| 3,954,528 | 5/1976 | Chang et al. | 149/19.4 |
| 3,960,390 | 6/1976 | Goetz . | |
| 3,966,225 | 6/1976 | Marlow . | |
| 3,966,226 | 6/1976 | Roth . | |
| 3,986,456 | 10/1976 | Doin et al. | 102/39 |
| 3,996,079 | 12/1976 | DiValentin | 149/35 |
| 4,002,514 | 1/1977 | Plomer et al. . | |
| 4,006,919 | 2/1977 | Neumann | 280/736 |
| 4,014,719 | 3/1977 | Wells | 149/19.7 |
| 4,014,720 | 3/1977 | Wells | 149/19.8 |
| 4,021,058 | 5/1977 | Suzuki et al. | 280/737 |
| 4,066,415 | 1/1978 | Kasama et al. | 23/281 |
| 4,092,188 | 5/1978 | Cohen et al. | 149/19.4 |
| 4,131,300 | 12/1978 | Radke et al. | 280/737 |
| 4,379,007 | 4/1983 | Fifer et al. | 149/22 |
| 4,389,263 | 6/1983 | Allen | 149/11 |
| 4,533,416 | 8/1985 | Poole . | |
| 4,555,277 | 11/1985 | Scribner | 149/19.4 |
| 4,608,926 | 9/1986 | Stevens | 149/21 |
| 4,689,097 | 8/1987 | Jones | 149/35 |
| 4,734,141 | 3/1988 | Cartwright et al. | 149/19.2 |
| 4,798,142 | 1/1989 | Canterberry et al. . | |
| 4,842,659 | 6/1989 | Mezger et al. | 149/19.2 |
| 4,915,755 | 4/1990 | Kim | 149/19.4 |
| 4,930,539 | 6/1990 | van Rooy | 137/514 |
| 4,931,112 | 6/1990 | Wardle et al. | 149/88 |
| 4,938,813 | 7/1990 | Eisele et al. . | |
| 4,948,439 | 8/1990 | Poole et al. | 149/46 |
| 4,950,458 | 8/1990 | Cunningham | 422/164 |
| 4,981,534 | 1/1991 | Scheffe | 149/19.91 |
| 4,983,235 | 1/1991 | Nyqvist et al. | 149/109.6 |
| 4,985,094 | 1/1991 | Nahlovsky | 149/19.92 |
| 4,991,870 | 2/1991 | Beusterien et al. | 149/19.92 |
| 5,003,887 | 4/1991 | Unterforsthuber et al. | 280/732 |
| 5,016,914 | 5/1991 | Faigle et al. . | |
| 5,054,811 | 10/1991 | Unterforsthuber et al. | 102/531 |
| 5,056,815 | 10/1991 | Geisreiter | 280/742 |
| 5,060,974 | 10/1991 | Hamilton et al. . | |
| 5,061,330 | 10/1991 | Reed, Jr. et al. | 280/736 |
| 5,062,365 | 11/1991 | Canterberry . | |
| 5,125,684 | 6/1992 | Cartwright | 280/736 |
| 5,131,680 | 7/1992 | Coultas et al. . | |
| 5,160,163 | 11/1992 | Castagner et al. . | |
| 5,184,846 | 2/1993 | Goetz . | |
| 5,199,740 | 4/1993 | Frantom et al. . | |
| 5,230,515 | 7/1993 | Cohen | 273/261 |
| 5,230,531 | 7/1993 | Hamilton . | |
| 5,230,532 | 7/1993 | Blumenthal et al. | 280/741 |
| 5,234,229 | 8/1993 | Gordon | 280/736 |
| 5,257,819 | 11/1993 | Frantom et al. | 280/523 |
| 5,273,312 | 12/1993 | Coultas et al. | 280/737 |
| 5,316,600 | 5/1994 | Chan et al. | 149/19.4 |
| 5,348,344 | 9/1994 | Blumenthal et al. . | |
| 5,351,988 | 10/1994 | Bishop et al. | 280/737 |
| 5,360,232 | 11/1994 | Lowe et al. . | |
| 5,378,018 | 1/1995 | Ketterer et al. | 280/737 |
| 5,411,290 | 5/1995 | Chan et al. . | |
| 5,423,570 | 6/1995 | Kort et al. . | |
| 5,441,302 | 8/1995 | Johnson et al. . | |
| 5,507,891 | 4/1996 | Zeigler | 149/47 |
| 5,586,783 | 12/1996 | Adam et al. | 280/737 |
| 5,589,141 | 12/1996 | Sides et al. | 422/164 |
| 5,601,309 | 2/1997 | Bender et al. | 280/737 |
| 5,602,361 | 2/1997 | Hamilton et al. . | |

AIRBAG DEVICE AND PROPELLANT FOR AIRBAGS

RELATED APPLICATIONS

The present application is a continuation-in-part of U.S. patent application Ser. No. 08/127,371, filed Sep. 28, 1993, for Propellant For Airbags, the entire disclosure of which is hereby incorporated by reference.

FIELD OF THE INVENTION

The present invention relates to an airbag device for motor vehicles and to a novel type of gas-emitting substance for the type of extreme gas generator that is employed for inflating airbags in motor vehicles.

BACKGROUND OF THE INVENTION

Accident protection of the airbag type has previously been the preserve of more exclusive car models. However, airbags are now becoming increasingly more common. In fact, we can soon expect airbags to be standard components in everyday cars, as well.

As airbags take the step from the more exclusive range of cars to everyday cars, the demand for a maintenance-free product has increased. Further, the product must be expected to work throughout the entire service life of the vehicle without changing any components. In other words, the airbag should operate for at least 10–12 years.

However, long, maintenance-free life has not hitherto been the case for airbag devices, since, in practice, safety engineers have utilized for airbags substances that, on their combustion, emit gases and are based either on sodium or potassium azide. Alternatively, nitrocellulose based double-base powder has been used as a gas-emitting substance. Nitrocellulose is a product with a clearly limited service life. On the other hand, azides are extremely toxic.

An example of an azide-rich propellant for airbags currently utilized in numerous, somewhat expensive car models is disclosed in Swedish patent document SE-A-7 314 045-1. This document describes a gas-emitting substance intended for use in airbag units and based on sodium azide, potassium perchlorate, silica dioxide and amino tetrazol. A corresponding gas-emitting substance based oil double-base powder is described in Swedish patent document SE-A-366 695. Furthermore, U.S. Pat. No. 4,931,112 discloses a novel type of gas-emitting substance for airbag units in the form of the compound 5-nitro-1,2,4-triazol-3-one (NTO), a compound that is also relatively new as an explosive.

The advantages inherent in NTO as a gas-emitting substance in airbag assemblies include that it purportedly provides an azide-free propellant gas at the same time as it is combusted. Also, it combusts relatively quickly and at a relatively low temperature, on the order of from 1,100°–1,200° C. As the NTO combusts, it does not emit any other toxic gases and limited quantities of water vapor.

However, one disadvantage of NTO is that it is soluble in water. Therefore, the possibility cannot be excluded that it is toxic. Furthermore, since NTO is a relatively new explosive, it is still relatively unknown. For example, among other variables, researchers have not fully examined the storage life of NTO under different conditions. A further disadvantage of employing NTO as a gas-emitting substance in an airbag is its relative expense as an explosive. NTO is, for example, at present, between about 10 and about 30 times more expensive than hexogen (RDX) or cyclo-1,3,5-trimethylene-2,4,6-trinitramine.

SUMMARY OF THE INVENTION

The present invention overcomes problems existing in the art of airbags and gas-emitting substances for airbag propellants by providing an airbag device that utilizes one of two well-known and well-tested high-energy explosives, namely, hexogen (RDX) or octogen (HMX), as the major-component of a gas-generating substance intended for airbag units.

According to preferred aspects, the present invention provides an airbag device that includes a gas-emitting substance chamber having an opening. A gas-emitting substance provided in the gas-emitting substance chamber comprises between about seventy-six and about eighty percent by weight of a high energy explosive and about twelve to about fifteen percent by weight of a combustible binder. An igniter provided within the gas-emitting substance chamber ignites the gas-emitting substance. A pressure reducing valve arranged in the opening of the gas-emitting substance chamber maintains a desired pressure in the gas-emitting substance chamber during combustion of the gas-emitting substance.

The airbag device also includes a gas container having an opening. A gas provided in the gas container oxidizes gas produced by the combustion of the gas-emitting substance. A closure closes the opening in the gas container.

A mixing chamber is joined to the gas-emitting substance chamber and the gas container in the vicinity of the opening of the gas-emitting substance chamber and in the vicinity of the opening of the gas container. The openings of the gas-emitting substance chamber and the gas container are directed toward an interior of the mixing chamber. The mixing chamber includes at least one outlet for directing gas resulting from the combustion of the gas-emitting substance toward an airbag. An airbag is interconnected with the mixing chamber and is inflated by the gas resulting from the combustion of the gas-emitting substance and the gas released from the gas container.

Still other objects and advantages of the present invention will become readily apparent those skilled in this art from the following detailed description, wherein it is shown and described only the preferred embodiments of the invention, simply by way of illustration of the best mode contemplated of carrying out the invention. As will be realized, the invention is capable of other and different embodiments, and its several details are capable of modifications in various obvious respects, without departing from the invention. Accordingly, the drawings and description are to be regarded as illustrative in nature and not as restrictive.

DETAIL DESCRIPTION OF THE INVENTION

Figure 1:
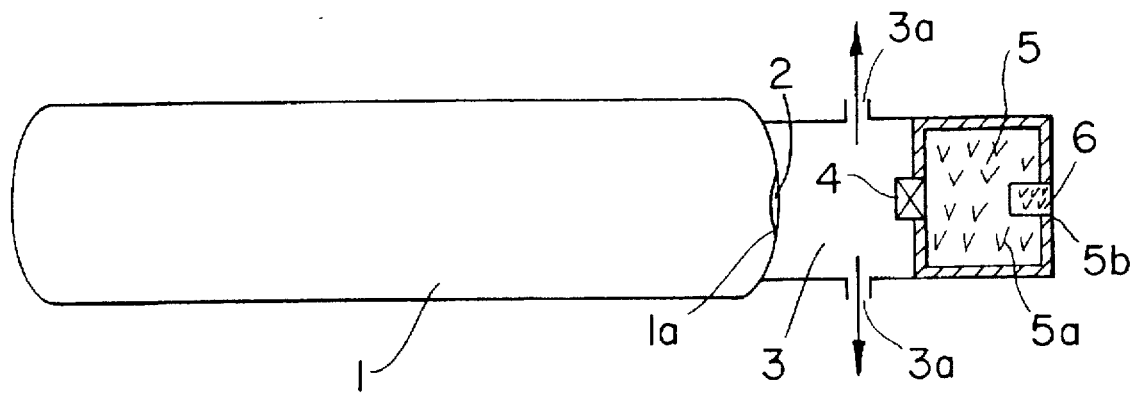
FIG. 1 represents a cross-sectional view of an embodiment of an airbag device according to the present invention.

FIG. 1 shows an embodiment of an airbag device according to the present invention. The airbag device shown in FIG. 1 includes a gas container or bottle 1. The gas container 1 may be any typical container for housing gas at temperatures, pressures, and other conditions that would be encountered in such an application as the present invention. The gas container preferably also will be capable of storing the gas for an extended period of time over the life of the automobile in which it is installed.

The size of the gas container 1 may depend upon the size of the automobile in which the airbag device is included, as well as the location of the airbag device. For example, a front seat passenger airbag typically is larger than a driver's-side airbag. Thus, the gas container for a passenger's-side airbag may be larger than gas container for the driver's-side airbag. Alternatively, the gas container may contain a larger amount of gas, although under greater pressure. Similarly, a side-impact airbag typically is smaller that either the driver's-side or passenger's-side frontal impact airbag.

The size of the gas container and/or amount of gas container therein may also depend upon the desired rate of inflation for the airbag. For example, if it is desired that the airbag inflate more quickly, the gas bottle may be smaller or filled with more gas to create a greater pressure-therein, thereby resulting in a greater rate of escape for the gas.

Typically, the gas container has an interior volume of from about 0.015 to about 0.45 liters. However, the airbag device of the present invention may include any desired size of gas container that is suitable for the size of the installation involved and to provide a suitable gas pressure.

The pressure of the gas within the gas container may vary from about 15 to about 60 MPa. However, once again, the gas pressure may vary, depending upon the application.

The gas provided within the gas container preferably functions to oxidize gas(ses) produced by the burning of the gas-emitting substance. The gas(ses) within the gas container may also serve to increase the pressure within the mixing chamber and, thereby, assist in inflating the airbag.

In accordance with the oxidizing function of the gas in the gas container, it preferably includes oxygen. However, another oxidizing gas may be included in the gas container. Of course, any gas utilized in the airbag device should be non-toxic to the people that the airbag protects.

The gas container may also include a mixture of gasses. For example, the gas may include a mixture oxygen or another oxidizing gas plus an inert gas. Examples of inert gasses that may be utilized according to the present invention include argon and/or helium.

The gas container includes an opening 1a that permits the gas(es) to escape and perform its function of oxidizing the combustion products produced by the combustion of the gas-emitting substance. The size of the opening 1a in the gas container, along with the pressure of the gas within the container, may help to control the rate at which the gas escapes from the gas container.

The opening 1a in gas container 1 may be closed by closure means 2. Preferably, the closure means will open in response to the ignition of the gas-emitting substance or a consequence of the combustion. For example, the opening of the closure means 2 may be caused by a build up of pressure in a mixing chamber as the gas-emitting substance combusts.

One example of a closure means that may be utilized to close the opening 1a in the gas container 1 according to present invention is a demolition closure. Another example is a lid or other member that will snugly fit in the opening of the gas container with enough force not to open in response to the pressure of the gas within the gas container. Such a lid or other member preferably opens when the force of the gas within the mixing chamber exceeds the force on the lid from the gas in the gas container and any frictional force from the interaction between the lid or other member and the gas container. As the closure is forced open, then gas preferably starts to flow from the gas container.

As stated above, the closure means may be activated by a build up of pressure in a mixing chamber 3 as gas is produced by the combustion of the gas-emitting substance. FIG. 1 shows one embodiment of a mixing chamber 3 according to the present invention. The mixing chamber 3 preferably is joined to or integral with the gas container 1 in the vicinity of the opening 1a in the gas container. The mixing chamber may be joined directly adjacent to opening 1a in the gas container or at some distance from the opening. In the embodiment shown in FIG. 1, the mixing chamber is not joined to the gas container directly adjacent to the opening 1a in the gas container.

Preferably, the joint between the mixing chamber and the gas container preferably is gas-tight or substantially gas-tight. A gas-tight or substantially gas-tight joint will permit a build-up of gas pressure within the mixing chamber as the gas-emitting substance combusts, thereby permitting the closure means 2 to be activated. The joint between the gas container and the mixing chamber need not be fully or substantially gas tight as long as sufficient pressure may be built up within the mixing chamber as the gas-emitting substance combusts to cause the closure means to open.

The mixing chamber 3 could be formed integral with the gas container 1 or joined to the gas container by welding, adhesives, or any other suitable means. Preferably, the means for joining the mixing chamber to the gas container may be able to withstand the conditions created by the combusting of the gas-emitting substance and the release of the gas in the gas container.

The volume of the mixing chamber 3 may vary, depending upon the application. For example, factors that may affect the size of the mixing chamber 3 can include the desired inflation speed for the airbag, the amount of gas-emitting substance utilized, the desired speed of opening of the closure means, the location of the airbag device, the speed that the particular gas-emitting substance combusts, among other factors.

The mixing chamber 3 preferably includes at least one exit passage 3a that permits gasses from the combustion of the gas-emitting substance and from the opening of the gas container to flow to an airbag (not shown) to inflate the airbag. The embodiment shown in FIG. 1 includes two exit passages. The exit passages may always be open or, alternatively, could be closed by closure means that open in response to the combustion of the gas-emitting substance, a build-up of pressure in the mixing chamber, an increase in temperature in the mixing chamber, or any other factor. The exit passages may be interconnected with the airbag with a conduit (not shown), such as a hose or any other suitable conduit for conducting the gas(ses) from the mixing chamber to the airbag.

The size of the exit passages may vary, depending upon a variety of factors. The factors could include the desired inflation speed for the airbag, the combustion rate of the gas-emitting substance, the location of the airbag in the automobile, among other factors.

The mixing chamber may also be joined to or integral with a gas-emitting substance chamber 5. The gas-emitting substance chamber 5 contains a gas-emitting substance or propellant 5a having a composition as described in detail below. As with the joint between the mixing chamber 3 and the gas container 1, the joint between the mixing chamber and the gas-emitting substance chamber preferably is gas-tight or substantially gas-tight. A gas-tight or substantially gas-tight joint will permit a build-up of gas pressure within the mixing chamber as the gas-emitting substance combusts, thereby permitting the closure means 2 in the gas container 1 to be opened. The joint between the gas-emitting substance chamber and the mixing chamber need not be fully or substantially gas tight as long as it permits sufficient pressure to be built up within the mixing chamber as the gas-emitting substance combusts to cause the closure means 2 in the gas container 3 to open.

The mixing chamber could be joined to the gas-emitting substance chamber by welding, adhesive, or any other suitable means. Preferably, the means for joining the mixing chamber to the gas-emitting substance chamber may be able to withstand the conditions created by the combusting of the gas-emitting substance and the release of the gas in the gas container.

The volume of the gas-emitting substance chamber may vary, depending upon the application. Among the factors that may affect the volume of the gas-emitting substance chamber are the size of the airbag included in the airbag device, a larger airbag requiring a greater amount of gas to fill it and, hence, a greater amount of gas-emitting substance. The volume of the gas-emitting substance chamber may be about the same as the volume of the gas-emitting substance required.

The shape of the gas-emitting substance chamber 5 may vary. The gas-emitting substance chamber shown in FIG. 1 is a rectangular box.

An igniter 6 for initiating the combustion of the gas-emitting substance may be provided within the gas-emitting substance chamber 5. The igniter 6 may be attached to an inner wall of the gas-emitting substance chamber. Alternatively, as with the embodiment shown in FIG. 1, the igniter may be provided in a passage 5b provided within the wall of the gas-emitting substance chamber 5.

The igniter may be a small charge of another explosive. Any ordinary igniter suitable to ignite the gas-emitting substances described herein may be used to ignite the gas-emitting substance in the airbag device. One example of an igniter includes boron and potassium nitrate.

The gas-emitting substance chamber may include another opening permitting the release of gasses generated by the combustion of the gas-emitting substance. Closure means 4 preferably is located within the opening. The closure means 4 preferably maintains a proper pressure within the gas-emitting substance chamber to ensure proper combustion of the gas-emitting substance since the combustion of the gas-emitting substance utilized with the airbag device according to the present invention is pressure dependent, as described below. By maintaining a minimum pressure within the gas-emitting substance chamber, the present invention helps to ensure that the gas-emitting substance will completely and evenly combust.

Figure 2:
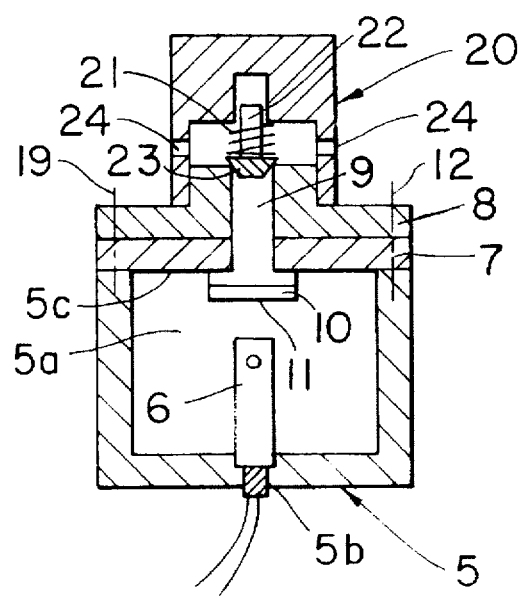
FIG. 2 represents a close-up cross-sectional view of an embodiment of a valve and a gas-emitting substance chamber according to the present invention.

According to preferred embodiments, the closure means 4, as shown in FIG. 1 and in greater detail in FIG. 2, may be a pressure reducing valve. As shown in FIG. 2, the valve may be a spring-loaded throttle valve biased towards a closed position. The opening characteristics of the valve preferably are adapted to the combustion and gas-emitting properties of the gas-emitting substances according to the present invention as described below in detail.

The valve preferably permits a combustion pressure within the gas-emitting substance chamber to be adapted to a predetermined level. Once reaching a predetermined minimum pressure, combustion gases formed by the combustion of the gas-emitting substance force the valve into an open position. In the open position, the combustion gasses may escape from the gas-emitting substance chamber into the mixing chamber and, eventually, the airbag.

As the gasses escape, a pressure decrease takes place in the gas-emitting substance chamber. However, the valve preferably prevents the pressure from dropping too low since the valve closes when the pressure within the gas-emitting substance chamber drops too low. As soon as the pressure within the gas-emitting substance chamber increases above the predetermined minimum pressure, the above-described opening sequence of the valve recommences.

FIG. 2 shows a close-up cross-sectional view of an embodiment of a gas-emitting substance chamber and a closure valve according to the present invention. In the embodiment shown in FIG. 2, the gas-emitting substance chamber 5 is filled with gas emitting substance 5a. An intermediate lid 7 may be used as a first closure of an open end 5c of the gas-emitting substance chamber 5. A primary lid 8 may be located on the intermediate lid 7. At least one bolt 12 may be utilized to hold the primary lid 8 and the intermediate lid 7 on the gas-emitting substance chamber 5.

A gas outlet 9 may be provided in both the intermediate lid 8 and the primary lid 8 to permit combustion gas to escape from the gas-emitting substance chamber. The gas outlet may have a cross sectional area of from about 2 to about 15 square centimeters. A spacer ring 10 with a mesh 11 may be utilized to prevent the contents of the gas-emitting substance chamber 5 from entering and potentially clogging the gas outlet 9.

The igniter 6, described above in greater detail, may be positioned in a passage 5b in the gas-emitting substance chamber 5.

A valve body 20 may be disposed over the gas outlet 9. The valve body 20 may include a valve 22 that is biased in a closed position by a compression spring 21. A valve cone 23 may be provided at the end of the valve body 22. The valve cone preferably is positioned in the gas outlet 9 by the compression spring 21 and blocks the gas outlet when the gas-emitting substance 5a is not combusting.

The valve body 20 preferably is forced into an open position, against the force of the spring 21, as the gas pressure within the gas-emitting substance chamber 5 rises above a predetermined minimum pressure as the gas-emitting substance 5a combusts. The burning rate of the gas-emitting substance is dependent upon the pressure within the gas-emitting substance chamber. Accordingly, the preferred pressure within the chamber and the opening and closing pressure for the valve body 20, may thus be chosen in accordance with the desired burning speed and, therefore, gas-emitting speed desired. An example of a gas pressure that may be maintained within the gas-emitting substance chamber is from about 15 to about 60 MPa.

Outlets 24 may be provided in the valve body 20. The outlets preferably distribute the combustion gasses to the mixing chamber 3.

When a crash occurs, the vehicle preferably includes a sensor (not shown) that detects the impact and sends a signal to activate the airbag device. The signal preferably causes the igniter 6 to initiate combustion of the gas-emitting substance 5a. As the gas-emitting substance combusts, gas is produced.

Upon generating a pressure within the gas-emitting substance chamber greater that the biasing force of the spring 21, the pressure preferably causes the valve to move into an open position, thereby permitting the gasses to escape from the gas-emitting substance chamber 5. The gas pressure may then be relieved and, if the pressure drops to a sufficient degree, the valve preferably moves into a closed position. If further burning of the gas-emitting substance causes a sufficient increase in the pressure within the gas-emitting substance chamber 5, the valve will preferably again open to relieve the pressure again.

Correctly adapted, a gas generator according to the present invention preferably will provide a continuous gas emission in which the pressure in the combustion chamber will only fluctuate somewhat, around a most advantageous combustion pressure. During the combustion, the valve 22 will vary between more or less opened positions.

As gas is released by the valve, it will move through passages 14, into the mixing chamber 3, resulting in an elevated pressure in the mixing chamber. The elevated pressure in the mixing chamber 3 will eventually rise to a level sufficient to open up the demolition closure 2 in the gas container. Upon opening of the closure 2, the gas within the gas container will be released into the mixing chamber 3. In the mixing chamber 3, the gas from the gas container 3 preferably will mix with the gases resulting from the combustion of the gas-emitting substance.

Mixing the two gasses results in achieving two important advantages. First, the oxygen or other oxidizing gas in the gas from the gas container will oxidize any carbon monoxide and hydrogen formed by combustion of the gas-emitting substance, such as a composition that includes RDX as described in detail below. Second, oxidation of carbon monoxide and hydrogen together with the mixture of any other gas in the gas container and any remaining gasses resulting from the combustion of the gas-emitting substance will raise the temperature of the combined gas mixture and the new hot gas mixture, which will be free of carbon monoxide and hydrogen, will then be delivered to the airbag, thereby inflating the airbag and protecting the occupant(s) of a vehicle in which the airbag device is installed.

Thus, according to the present invention the gas-emitting substance includes between 50 and 95 percent by weight fine crystalline RDX and/or HMX. Moreover, the gas-emitting substance may include between 5 and 50 percent by weight of an energetically or non-energetically combustible plastic binder compatible with the other components. The binder may include substances such as polyurethane (PU), cellulose acetate butyrate (CAB), hydroxy-terminated polybutadiene (HTPB), ethyl cellulose (EC), glycidyl acid polymers (GAP), polymers of 3-nitrateomethyl-3-methyl oxetane (polynimmo), or polymers of glycidyl nitrate Polyglyn). In addition, the gas-emitting substance may include up to 5 percent by weight nitrocellulose, as well as alternative known plasticizers and other minor additives known in powder and explosive contexts and serving other functions.

Common to all of these three product types is that the crystalline explosive is used bonded with a binder to considerably larger particles, granulate or bodies, than the individual explosive crystals. In PBX contexts, relating to explosive bodies that are to be detonated, these bodies may be very large indeed. On the other hand, the LOVA powder, which is primarily used as a propellant charge in artillery guns and, thus, is to be combusted under deflagration and not detonated, the powder bodies employed are generally of the same size and configuration as the nitrocellulose powder that they are intended to replace.

However, a difference between the LOVA powder and the nitrocellulose is that the available combustion area must often be increased as compared with the nitrocellulose powder, since the LOVA powder has a generally lower combustion rate than the nitrocellulose powder. For example, a larger combustion area for an explosive powder can be achieved by giving a multi-cavity charge more combustion channels.

Along these lines, PBX explosives include crystalline explosives with a mean particle size of 1–2 mm, while the product according to the present invention, which is considered low-sensitive alternatives to the common nitrocellulose explosive, contain crystalline explosives with a mean particle size of between 1 and 20 μm. In employing a gas-emitting substance according to the present invention, this is a basic precondition for imparting to the product a suitable combustion rate.

PBX products are intended to be detonated and, in such instance, be employed in completely different configurations and contain crystalline explosives of a completely different crystal size than the product employed according to the present invention. Differences between the LOVA powder and the product employed according to the present invention also reside in their different respective fields of use.

The LOVA powder is employed as a propellant primarily in artillery guns. On the other hand, the present invention relates to a more unusual field of application for crystalline high-energy explosives. Namely, the present invention is a substance that, upon its combustion, emits gases in an airbag unit.

The use of the explosives according to the present invention is radically different than the typical fields of use of PBX explosives and LOVA powders. Therefore, any similarities between the composition of the present invention and known explosive compositions lend little if anything to adapting these materials to the field of use of the present invention.

The advantages of this somewhat unusual choice will be clear when the seemingly daring concept of incorporating high-energy explosives in everyday vehicles is considered. Both of the high-energy explosives, RDX and HMX, relevant here, as known, age but slightly even at high temperatures. The above-proposed plastic binders enjoy, in addition, a high degree of compatibility with the pertinent high-energy explosives utilized according to the present invention.

A person skilled in the art, once aware of the present disclosure, could tailor the combustion properties of the materials included in the gas-emitting substances according to the present invention to make the substances gas-emitting on their combustion. Hence, the product according to the present invention may contain minor quantities of nitrocellulose. However, the quantities of nitrocellulose that may be included have not proved to be capable of affecting the superior storage life of the product.

As always, the combustion rates of the products according to the present invention will depend, on the one hand, upon those components included and on the quantities. On the other hand, the combustion rates will depend upon the combustion area available on combustion, the particle size of the RDX or HMX crystals, respectively, and the pressures at which the combustion takes place.

However, for determining these criteria routine testing is first required with respect to the volume and hydrodynamic design of each respective gas generator, as well as the desired gas volume per unit of time, gas pressure and so on. Consequently, these details will not be described in greater detail in this context.

For reducing carbon monoxide generated in the combustion, it is possible to add an oxygen-emitting substance such as potassium nitrate or other oxidizing agent, which has proved to give a marked reduction of the carbon monoxide content. Above all, in airbag units that are ventilated within the vehicle interior, it may be desirable to add quite high contents of oxidizing agent, on the order of 30 percent and more.

The following examples present a number compositions according to the present invention that may be employed with the apparatus according to the present invention.

EXAMPLE 1

The composition according to Example 1 includes the following components:
76 percent by weight RDX;
12 percent by weight CAB;
7.6 percent by weight TBC (tributyl citrate);
4 percent by weight nitrocellulose; and
0.4 percent by weight ethyl centralite.

EXAMPLE 2

The composition according to Example 2 includes the following components:
78 percent by weight RDX;
15 percent by weight CAB; and
7 percent by weight TBC.

EXAMPLE 3

The composition according to Example 3 includes the following components:
80 percent by weight RDX; and
20 percent by weight hydroxy terminated polybutadiene (HTPB).

In the above-disclosed examples, RDX has been generally disclosed as a crystalline explosive. However, the RDX may be readily replaced by one or more of the crystalline high-energy explosives disclosed by way of introduction. However, replacing the explosive will slightly modify the combustion rate.

In all of the above-described substances according to the present invention and usable in the method and apparatus according to the present invention, the crystalline explosive preferably has a main particle size of between 1 and 20 μm and, most preferably, about 5 μm.

In this disclosure, there are shown and described only the preferred embodiments of the invention, but, as aforementioned it is to be understood that the invention is capable of use in various other combinations and environments and is capable of changes or modifications within the scope of the inventive concept as expressed herein:

We claim:
1. An airbag device, comprising:
a gas-emitting substance chamber having an opening;
a gas-emitting substance provided in said gas-emitting substance chamber comprising between about seventy-six to about eighty percent by weight of a high energy explosive and about twelve to about fifteen percent by weight of a combustible binder;
an igniter provided within said gas-emitting substance chamber for igniting said gas-emitting substance;
a pressure reducing valve arranged in said opening of said gas-emitting substance chamber for maintaining a desired pressure in said gas-emitting substance chamber during burning of said gas-emitting substance;
a gas container having an opening;
a gas provided in said gas container for oxidizing gas produced by said burning of said gas-emitting substance;
a closure for closing said opening in said gas container;
a mixing chamber joined to each of said gas-emitting substance chamber and said gas container in the vicinity of said opening of said gas-emitting substance chamber and in the vicinity of said opening of said gas container, said openings of said gas-emitting substance chamber and said gas container being directed toward an interior of said mixing chamber, burning of said gas-emitting substance releases gas into said mixing chamber thereby causing a gas pressure to increase in said mixing chamber which causes said closure to open, said mixing chamber including at least one outlet for directing gas resulting from said burning of said gas-emitting substance and opening of said gas container toward an airbag; and
an airbag interconnected with said mixing chamber and inflated by said gas resulting from said burning of said gas-emitting substance and opening of the gas container.

2. An airbag device according to claim 1, wherein said closure is a demolition closure.

3. An airbag device according to claim 1, wherein said gas in said gas container includes oxygen.

4. An airbag device according to claim 3, wherein said gas in said gas container includes an inert gas.

5. An airbag device according to claim 1, wherein said gas-emitting substance further comprises an additive.

6. An airbag device according to claim 1, wherein said gas-emitting substance further comprises up to about five percent nitrocellulose.

7. An airbag device according to claim 1, wherein said gas-emitting substance comprises:
76 percent by weight hexogen;
12 percent by weight cellulose acetate butyrate;
7.6 percent by weight tributyl citrate;
4 percent by weight nitrocellulose; and
0.4 percent by weight ethyl centralite.

8. An airbag device according to claim 7, wherein said gas-emitting substance comprises a powder including particles having a mean thickness of between about 1 and about 20 μm.

9. An airbag device according to claim 1, wherein said gas-emitting substance further comprises an oxidizing agent.

10. An airbag device according to claim 1, wherein said binder is energetic.

11. An airbag device according to claim 1, wherein said binder is non-energetic.

12. An airbag device according to claim 11, wherein said non-energetic binder is selected from the group consisting of a polyurethane and hydroxy terminated polybutadiene.

13. An airbag device according to claim 1, wherein said binder is selected from the group consisting of cellulose acetate butyrate and ethyl cellulose.

14. An airbag device according to claim 10, wherein said energetic binder is selected from the group consisting of a glycidyl azide polymer, a polymer of 3-nitrate-methyl-3-methyl oxymethane, and a polymer of glycidyl nitrate.

15. An airbag device according to claim 5, wherein said additive includes tributyl citrate.

16. An airbag device according to claim 1, wherein said high-energy explosive comprises a mixture of hexogen and octogen.

17. An airbag device according to claim 9, wherein said oxidizing agent is potassium nitrate.

18. An airbag device according to claim 1, wherein said gas-emitting substance includes about eighty percent by weight hexogen and about fifteen percent by weight cellulose acetate butyrate.

* * * * *